(12) United States Patent
Busch

(10) Patent No.: US 11,956,294 B2
(45) Date of Patent: Apr. 9, 2024

(54) SYSTEMS AND METHODS FOR ANALYZING STREAMED MEDIA TO DETERMINE COMMON SOURCE ENCODERS

(71) Applicant: NAGRASTAR LLC, Englewood, CO (US)

(72) Inventor: Michael Augustin Busch, Highlands Ranch, CO (US)

(73) Assignee: NAGRASTAR LLC, Englewood, CO (US)

(*) Notice: Subject to any disclaimer, the term of this patent is extended or adjusted under 35 U.S.C. 154(b) by 310 days.

(21) Appl. No.: 17/152,763

(22) Filed: Jan. 19, 2021

(65) Prior Publication Data

US 2022/0232057 A1 Jul. 21, 2022

(51) Int. Cl.
| | |
|---|---|
| *H04L 65/70* | (2022.01) |
| *G06F 21/10* | (2013.01) |
| *G06F 21/64* | (2013.01) |
| *H04L 65/75* | (2022.01) |
| *H04N 19/177* | (2014.01) |

(52) U.S. Cl.
CPC ........... *H04L 65/70* (2022.05); *G06F 21/10* (2013.01); *G06F 21/64* (2013.01); *H04L 65/75* (2022.05); *H04N 19/177* (2014.11)

(58) Field of Classification Search
CPC ....... H04L 65/70; H04L 65/75; H04N 19/177; G06F 21/10; G06F 21/64
See application file for complete search history.

(56) References Cited

U.S. PATENT DOCUMENTS

| | | | |
|---|---|---|---|
| 10,135,899 B1* | 11/2018 | Nielsen | H04L 65/611 |
| 11,089,076 B1* | 8/2021 | Thario | H04L 65/612 |
| 2008/0240490 A1 | 10/2008 | Finkelstein et al. | |
| 2009/0257490 A1 | 10/2009 | Chen et al. | |
| 2014/0185466 A1 | 7/2014 | Syed et al. | |
| 2015/0095452 A1* | 4/2015 | Agarwal | H04L 65/762 |
| | | | 709/217 |
| 2016/0330264 A1* | 11/2016 | Chang | G06F 9/452 |
| 2020/0226233 A1* | 7/2020 | Penugonda | G06F 21/16 |
| 2022/0191487 A1* | 6/2022 | Kuo | H04N 19/176 |
| 2022/0201306 A1* | 6/2022 | Kato | H04N 19/18 |

OTHER PUBLICATIONS

European Patent Application No. 22152016.6, Extended European Search Report dated Jun. 20, 2022, 7 pages.

* cited by examiner

*Primary Examiner* — Kristie D Shingles

(57) ABSTRACT

Systems and methods are disclosed for analyzing different media to determine if the media originated from the same source. A two-part analysis is provided. During the first part, target data streams are analyzed to determine a template for the data stream or file, based upon the encoder used to encode the media transmitted in the data stream or stored in a file. After generating templates for the different streams, the templates are compared to determine which streams have matching templates. The second part of the analysis includes monitoring streams with matching templates to identify the same piece of media content in each of the streams. Upon identifying the same content, the content of each stream is synchronized and then compared to determine if the compared pieces of content were generated using the same encoder.

20 Claims, 6 Drawing Sheets

| Stream Identifier 502: | Encoder Template 504: | Encoder Features 506: | Source ID 508 |
|---|---|---|---|
| Stream ID1 | IBPPBPPBPPBPPBPP | XXXXX | Encoder A |
| Stream ID2 | IBBBBBBBB | XXXXX | Encoder D |
| Stream ID3 | IBBBBBBBB | XXXXX | Encoder D |
| Stream ID4 | IBPPIBPPIBPPIBPPIBPP | XXXXX | Encoder A |
| Stream ID5 | IPPIPPIPPIPPIPP | XXXXX | Encoder E |
| Stream ID6 | IBPPIBPPIBPPIBPPIBPP | XXXXX | Encoder A |
| Stream ID7 | IBPBPBPBPBPBPBP | XXXXX | Encoder C |
| Stream IDN | IIIIIIIIIIIIIIIIII | XXXXX | Encoder B |

SYSTEMS AND METHODS FOR ANALYZING STREAMED MEDIA TO DETERMINE COMMON SOURCE ENCODERS

BACKGROUND

A prevalent problem a content provider must address is unauthorized media access. Existing techniques generally relate to identifying content streamed over a network. However, these existing techniques tend to be computationally intensive. Furthermore, while existing techniques are capable of identifying particular content, existing techniques generally cannot determine the source of the content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to systems and methods for determining whether content distributed through different channels originate from a similar source. The present disclosure provide a two-part analysis for confirming whether media originates from the same source that addresses the limitations noted above. Initially, target data streams, or files, are analyzed to determine a template for the data stream or file, based upon the encoder used to encode the media transmitted in the data stream or stored in a file.

After generating templates for the different data streams, the templates are compared. Templates that do not match can be eliminated from further analysis as there is a high chance of likelihood that the underlying content was generated using different encoders. As such, the initial phase acts a filter to the second stage of the two-part analysis. During the second stage, the first and second data streams are analyzed to identify a similar piece of content from the first and second data streams. For example, the same movie may be identified on the first data stream and second data stream. Once the same piece of content is identified, the content from the first and second stream is analyzed to determine whether the content originated from the same encoder.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 5 depicts an exemplary report generated by a stream identification service.

FIG. 5 depicts an exemplary report generated by a stream identification service.

DETAILED DESCRIPTION

Figure 1:
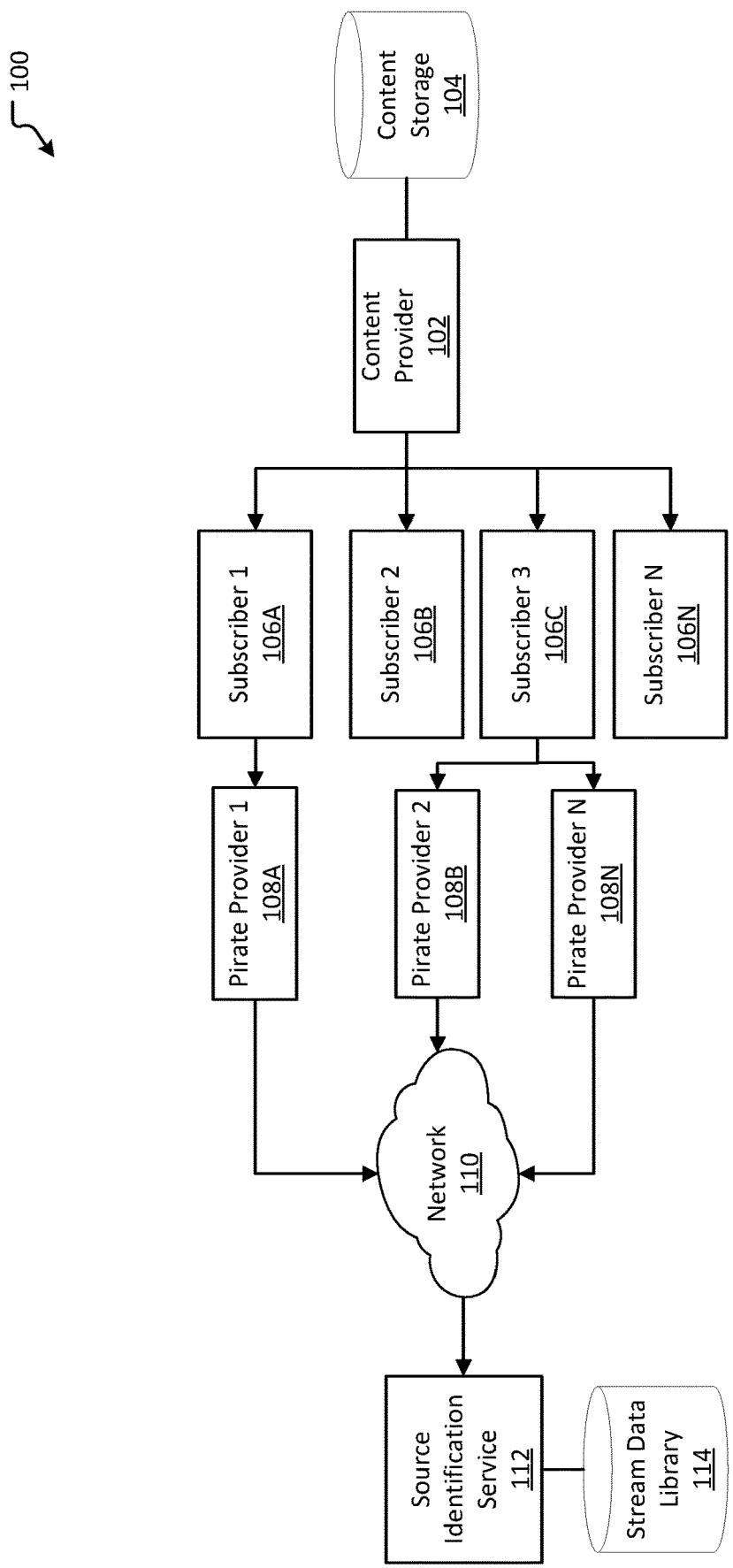
FIG. 1 is an exemplary system for determining the source of pirated content shared over a network.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods for determining whether content streamed via pirate distribution streams and/or pirated content originate from a similar source. As discussed herein, pirated content is media (i.e., video, audio, images, etc.) that is transmitted and/or accessed without the approval of the content owner or provider. For example, a content owner or a content service provider, such as a satellite television service provider, cable service provider, IPTV service, music or video streaming services, etc., provide media to paid subscribers. The media is provided over a network or transmission medium, such as a satellite broadcasts system, cable or fiber networks, protected over-the-air transmissions, or open networks such as the Internet. Paying subscribers are granted access to the content via devices, such as, for example, a set-top-box, or, in the case of transmission over an open network, credentials provided by the content provider.

A prevalent problem a content provider must address is unauthorized media access. Of particular concern are pirate content providers. As used herein, a pirate content provider is a provider who, via either authorized or unauthorized access, retransmit the content to unauthorized users. This problem continues to grow as more users gain access to broadband networks capable of fast data transfer speeds. These pirate content providers access content from a content service provider, such as a paid television provider, streaming media provider, or the like, and retransmit the content via the an open network, such as the Internet, to other users. As an example, in a paid TV context, a pirate content provider may access paid television via an authorized set-top-box. The content may then be transmitted, via the Internet, from the set-top-box to other users who do not own a set-top-box and/or are otherwise not authorized to access the paid TV content. The retransmitted content is formatted in accordance with a codec that is appropriate for the type of content being transmitted. In some circumstances, the retransmitted content may be encoded by the pirate service provided prior to transmission. In other circumstances, the pirate service provider may retransmit the content using the same encoding provided by the content service provider.

Many techniques have been developed to identify the actual content of a file or stream of data. As these techniques are content dependent, that is, they rely on matching the content of an analyzed file or data stream to known content, the existing solutions are both time dependent and computationally intensive. For example, when analyzing streamed content, such has a video, the streamed video must be first be synched with a known copy of the video and then compared in a frame-by-frame or bit-by-bit manner. Furthermore, existing solutions for identifying content are generally unable to determine whether the identified content originates from a common provider. The ability to determine if different data streams or items are content originate from a similar source is particularly important when it comes to enforcement. As noted above, the distribution of pirated content is prevalent over the Internet. The scope of the unauthorized distribution differs between pirate content providers. For example, some pirate content provider may provide unauthorized content over a single stream to a handful of users while other pirate content providers may provide unauthorized content over thousands of streams to thousands, or even millions, of unauthorized users. It is important for content providers to be able to determine the scope of a pirate content provider's activities to prioritize enforcement efforts geared to stopping pirate content transmission.

Aspects of the present disclosure provide a two-part analysis for confirming whether media originates from the same source that addresses the limitations noted above. Initially, target data streams, or files, are analyzed to determine a template for the data stream or file, based upon the encoder used to encode the media transmitted in the data stream or stored in a file. The template generated in this initial step is neither time dependent nor content dependent. That is, the generated template will be the same for a particular encoder regardless of the underlying content of the analyzed data stream or file. Furthermore, generation of the template is not time dependent. That is, the aspects disclosed herein will generate the same template for media from the same encoder regardless of when the analysis is performed. Unlike existing solutions for analyzing digital content, synchronization is not required to generate a template during the initial analysis. As an example, consider video content analyzed for two different data streams at two different points in time. In said example, the first stream may be a sports program streamed at a first time. The second data stream may be a classic movie streamed at a second time different from the first time. Using the system and methods disclosed herein, if the sports program and the classic movie were encoded by the same encoder, the template generated for each data stream will be the same regardless of the content being different and the analysis being performed at a different time. The initial step of template generation can be performed on any number of streams and/or data files.

Upon generating templates for the different data streams or files, the templates for the different streams are compared. If a template for a first data stream matches a template from a second data stream, the media transmitted over the first data stream and the second data stream may be from the same encoder, that is, may have originated from the same source. If, however, the templates generated for the first data stream and the second data stream do not match, then it can accurately be determined that the media from the first and second stream was generated using different encoders. As such, the first data stream and the second data stream originate from different sources. As used herein, a file or data stream originating from the same source does not necessarily imply that the file or data stream originated from the same network address or were stored on the same server. Rather, a similar source, as discussed herein, relates to media generated by the same encoder. This is an important distinction as a single pirate service provider may distribute content using a number of different servers, data streams, or channels.

The second part of the analysis is then performed on data streams and/or files having matching templates. While the first part of the analysis can accurately determine which data streams and/or files are from different source, additional analysis is required to determine with a high level of confidence that the data streams and/or files did in fact originate from the same source. The second part of the analysis is more computationally intensive as the same content is analyzed. For example, in the second step, two data streams having the same template are further analyzed by comparing similar content from each data stream. When performing the second analysis, the first and second data streams are analyzed to identify a similar piece of content from the first and second data streams. For example, the same movie may be identified on the first data stream and second data stream. Once the same piece of content is identified, the content from the first and second stream is analyzed to determine whether the content originated from the same encoder. Unlike previous techniques of matching content, which rely upon determining that the visual or audio features of the content are the same, merely confirming that similarity between the visual or audio features is not sufficient to determine that the content originated from the same encoder. That is, the visual and audio features of a movie will be the same regardless of the movie's encoding. Thus, in order to accurately determine whether the content was generated by the same encoder, the data characteristics of the data stream or data file is compared to determine if the two pieces of content being compared were generated by the same encoder. While it is possible for two different encoders to generate media having the exact same data characteristics, testing has shown that it is unlikely that the two encoders, even if they are the same type of encoders, will actually generate files having the same data characteristics. This is due to many factors, such as the different parameters set on each encoder. As such, if the data characteristics are the same, it can be determined with a high level of confidence that the media from the two different data streams and/or files were generated by the same encoder and, thus, originated form the same source.

For ease of discussion, aspects of the present disclosure are described with respect to the underlying media content being video generated using a variant of an MPEG encoder. While the examples described herein are specific to MPEG encodings, one of skill in the art will appreciate that the aspects described herein can be equally applied to video generated using other types of codecs such as, but not limited to, VP8, VP9, DivX and the like. Furthermore, one of skill in the art will appreciate that the technologies disclosed herein are not limited to video content but could also be employed with other types of media formats, such as images or audio files. As such, the aspects disclosed herein are not limited video media or the MPEG codec, but could be equally practiced with other video codecs and other types of media, as will be appreciated by those of skill in the art.

FIG. 1 is an exemplary system 100 for determining the source of pirated content shared over a network. In examples, a content provider 100 access content from a content storage 104 and distributes the contents to various subscribers 106A, 160B, 106C, and 106N. In one example, content provider 102 may be a paid TV provider, such as a cable or satellite television provider. In other aspects, content provider 102 may be a streaming service that streams media over a network. While the media described herein is video content, one of skill in the art will appreciate that similar techniques can be employed to analyze other types of content as well. Subscribers 106A-C and 106N may be legitimate subscribers. That is, 106A-C and 106N may pay to access content provided by content provider 102. However, the legitimately accessed content may, either knowingly or unknowingly, be accessed by pirate content providers, such as pirate providers 108A, 108B, and 108N. Although a limited number of subscribers and pirate providers are depicted in system 100, one of skill in the art will appreciate that there can be any number of subscribers or pirate providers in system 100.

As shown in FIG. 1, Pirate Provider 1 108A accesses content from content provider 102 via Subscriber 1 106A, while Pirate Provider 2 108A and Pirate Provider N 108N access content from content provider 102 via Subscriber 103C. In examples, the pirate providers may access content via the subscribers in a number of different ways. For example, the pirate provider can access the content via a set-top-box associated with the subscriber, by accessing a subscriber's password to access a streamed service, or the like.

Pirate Providers 108A, 108B, and 108N retransmit the content via network to a number of different illegitimate users (not shown) via network 110. For example, the pirate providers may retransmit the content via a data stream accessible to other users over the Internet. A pirate provider may encoder the media using their own encoder prior to retransmitting the content. Alternatively, the pirate provider may use the same encoding, for example, provider by a subscriber set-top-box instead of re-encoding the media prior to transmitting the media over network 110.

A source identification service 112 monitors for pirated data streams over the network 110. Upon identifying a pirate data stream, source identification service 112 access the network data traffic of the stream and performs an analysis of the streamed media to generate an encoder template for the streamed media. The template generated by the source identification service may vary depending on both the encoder used to generate the media and the media codec. For example, the MPEG coded uses three types of pictures, or frames, when encoding video content. The first type of frame is an Intra-coded picture, also known as an I-frame, which represents a complete image, such as a JPG image, representative of a video frame. The second type of frame is a predicted picture, also known as a P-frame, which represents the changes in an image from the previous frame. The third type of frame is a bidirectional predicted frame, also known as a B-frame, which encodes the differences between the current frame, the preceding frame, and the following frame. A sequence of I-frame, P-frame, and B-frames is arranged in a group of pictures ("GOP"). A GOP sequence is defined by the pattern of frames between each successive I-frame. The length and sequence of frames in the GOP is encoder dependent. That is, different encoders will generate encodings having different GOP lengths and sequences based upon the particular encoder's settings. Furthermore, the GOP sequence can be variable length or fixed length, based upon encoder settings. A variable length GOP has a different number of frames between each successive I-frame while a fixed length GOP always has the same number of frames between successive I-frames.

As noted above, the media source determination disclosed herein may be a two-step analysis. The first step comprises determining an encoder template for a data stream or data file. In example, the media template may be any type of data pattern generated by the encoder. Referring to an example where the media is encoded using a MPEG variant codec, the template pattern may be defined by the size and frame patters of a GOP. For example, the source identification service may identify the network stream associated with pirated media to determine the size and pattern of a GOP. For example, the length and pattern of B-frames and/or P-frames between each subsequent I-frame for the media may be determined and used to generate a template for a target stream. For example, a template for a first stream may be represented as IBPPBPPBPPBPPBPP. While a GOP is generally defined as the length and pattern between subsequent I-frames, the template generated for a stream by the stream identification service may include multiple GOPs, such as IBPPIBPPIBPPIBPPIBPP. That is, the stream source identification service continually analyzes the network traffic data to find a repeating pattern for media in the data stream. Once a pattern is identified, the pattern is stored as a template for the analyzed stream. It is important to note that the pattern identified in the initial step of the source analysis is consistent for an encoder regardless of the actual content being encoded by the encoder. In other words, the same encoder will produce the same pattern regardless of the actual content being encoded. Furthermore, the pattern can be determined in a time independent manner. That is, the pattern is determinable for the data stream regardless of when the pattern is determined. For example, if the stream is analyzed again later in time, for example, the next hour, day, week, or even year, the pattern determined by the source identification service will be the same so long as the same encoder is used to generate the streamed media.

Once the pattern for the stream has been identified, the source identification service stores an identifier for the data stream along with a copy of the stream template. Because the template is generated by examining video data extracted from network traffic data, and not the underlying media content itself (e.g., the actual image or sound encoded in the media), generating a template for a stream of data can be performed quickly and without utilizing a significant amount of computational resources. The source identification service and therefore generate templates for a large number of identified pirate data streams utilizing less computational resources than traditional solutions, which require analyzing the underlying image and/or audio of the media file. In doing so, the source identification service generates a library of stream templates associated with individual pirate streams. The generated stream library is stored by the stream identification service in stream data library 114.

The second step of source analysis is performed by analyzing the stream templates stored in stream data library 114. As previously noted, once an encoder has been configured all of the data streams generated by it will have the same template. The stream identification service compares the stored templates to determine which streams have matching templates to generate one or more subsets of streams with each stream in a subset having the same template. The second step of the source analysis is performed on streams in each subset. For example, the stream identification service 112 identifies two streams from a subset. The stream identification service 112 then analyzes the streamed network traffic to identify the same content on each of the streams. Upon identifying the same content, the stream data service may store a copy of the content from each stream. The content from each of the streams is then synchronized for comparison. In one example, the streams may be synchronized by identifying a first portion of content in the first stream. The second stream is analyzed to determine when the same portion of content is played. For example, an I-frame from the first content may be identified. I-frames from the second streamed content are then compared to the identified I-frame to find a matching I-frame in the second streamed content. Unlike the template analysis, the content represented by the I-frames in the first and second streams must be the same for the second step analysis. In the case of MPEG, and I-frame is a complete image of a video frame. In the MPEG example, synchronizing the first and second streamed content comprises identifying the same image in the first and second streamed content. One of skill in the art will appreciate that any techniques used to identify matching content may be employed for the synchronization step without departing form the scope of this disclosure.

Once the first and second data streams are synchronized, the source identification service performs a content analysis on the two streams to determine if the streamed media was encoded by the same encoder. The content analysis, however, cannot be performed by merely matching the content to determine that the visual or audio content is similar at a synced portion. That is, the same frame in a movie, even if the movie is encoded by different encoders, will be visually similar Thus, in order to determine whether the streams originated from a similar source, the content analysis compares characteristics of the content that are encoded dependent. For example, referring back to the MPEG example, while the content of the same I-frames of a movie may be visually indistinguishable, the file content for the frame will likely differ based upon the encoder. As such, the content analysis performed in the second part is based upon a file comparison of the two I-frames. This can be done by performing a bit-by-bit analysis of the two I-frames. Alternatively, a more efficient way of comparing the two I-frames would be to generate a checksum or a hash of the two I-frames. If the I-frames were generated by the same encoder, their checksums or hashes will be the same. As such, in one example, the checksum or hash of the two I-frames are compared to determine if the media originated from the same encoder. If the I-frames do not match, then the two streams being compared originated from different sources. If the I-frames match, a determination can be made that the streamed media originated from the same encoder and, thus, the same source.

As previously noted, it is possible, though uncommon, that two different encoders will generate the exact same template and same I-frame. Thus, merely matching a single I-frame is a strong indicator that the streamed media originated from the same encoder, but not necessarily dispositive. In order to increase confidence that the streamed media sources are from the same encoder or source, additional frames can be analyzed from the first and second streamed content. In one example, subsequent I-frames may be compared. Each subsequent match increases confidence that the media being compared did, in fact, originate from the same encoder. Thus, subsequent I-frames can be compared with each subsequent match resulting in a higher confidence that the streamed media content originated from the same source. The comparison of subsequent frames can continue until a threshold confidence value is reached. Alternatively, or additionally, B-frames and P-frames can also be analyzed without departing from the scope of this disclosure. While examples provided herein are specific to MPEG, one of skill in the art will appreciate the same process can be performed based using other video codecs, such as VP9 and H.265, which each employ their own types of frames. Further, the teaching of the present application can be applied to other types of media and or media codecs, such as audio codecs, without departing for the scope of this disclosure.

Upon identifying streams having a similar source encoder, the source identification service can associate the associated streams in the stream data library, thereby providing reports of how many different streams originate from the same encoder and, thus, the same pirate source and/or the same legitimate subscriber. This data can be used to direct enforcement operations by identifying the scope of different pirate operations.

Figure 2:
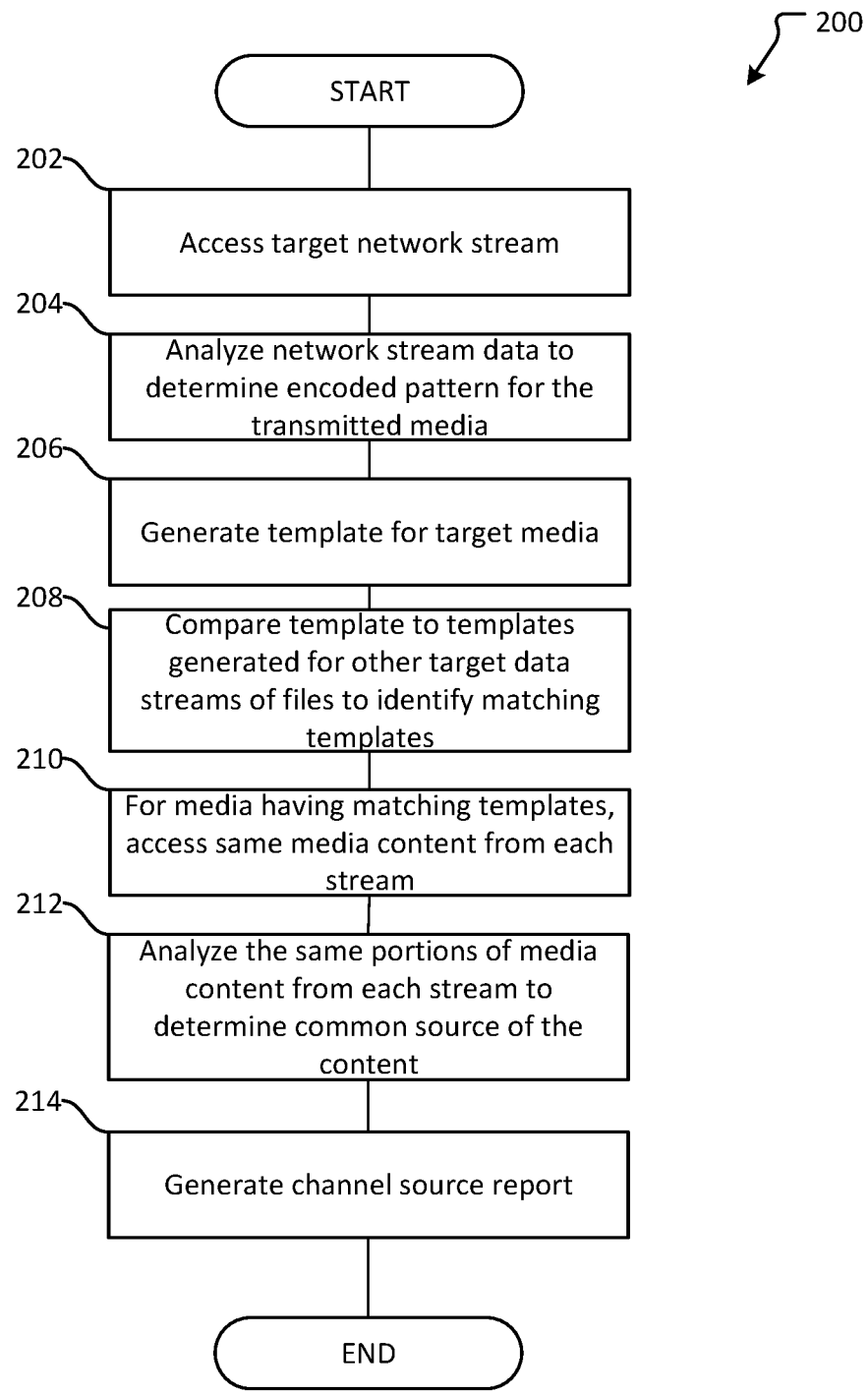
FIG. 2 is an exemplary method for determining whether two or more items of media transmitted via a network originate from the same source.

FIG. 2 is an exemplary method 200 for determining whether two or more items of media transmitted via a network originate from the same source. A general order of the operations for the method 200 is shown in FIG. 2. One of skill in the art, however, will appreciate that the method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1 and 3-6. In aspects, the method 200 may executed by a device executed by the source identification service 112 shown in FIG. 1.

Flow begins at operation 202 where a network data stream transmitting media is accessed. In one example, the network data stream may be a known stream of pirated content. In other examples, an automated service may be employed crawl the web and identify websites streaming media. The automated service may then access stream traffic data for the streamed media at operation 202. Accessing the target network stream, in one example, comprises storing a copy of the streamed data for later analysis. Alternatively, the stream may be accessed by a packet sniffer capable of analyzing the streamed data in real-time.

Flow continues to operation 204, where the network data stream is analyzed to determine an encoded pattern within the data. Referring to the MPEG examples previously discussed, an encoded pattern may be determined by analyzing a sequence of frames to determine a GOP size and/or pattern. One of skill in the art, however, will appreciate that the aspects disclosed herein are not limited to video data encoded according to an MPEG variant, but, rather, the aspects disclosed herein may be employed on other types of media using other encoding standards. At operation 204, the network data is analyzed to determine a repeating pattern in the encoded data. In examples, the repeating pattern is associated with a specific encoder type, one or more encoder parameters, or any other information that can be used to identify an encoder or specific encoding behavior. Once a repeating pattern is identified, flow continues to operation 204 a template is generated based upon the identified pattern. For example, a template may be a sequence of I, B, and/or P frames for a GOP, a GOP size, whether the GOP size is fixed or variable, or any other encoding pattern for the media transmitted in the network data stream.

Generating the template may be associated with a network data stream identifier and stored for later analysis. As previously discussed, the template generated at operation 206 represents features or a pattern common to the encoder used to generate the media stored transmitted in the network data stream. As such, the template should be identifiable in other media encoded by the same encoder, regardless of the underlying content or the time that the encoding was generated. As such, the generated template may be stored with an associated network stream identifier, or file identifier if analyzing a media file, for later analysis. Generating and storing the template may also include collecting other encoder features from the network data stream, or file, such as, but not limited to, GOP size, quantization values, DC coefficients, or any other encoder features which can be derived or identified from the network data stream. Further detail regarding the generation of a template is described with respect to FIG. 3.

At operation 208, the generated template is compared to the templates generated for other known data streams or files. As discussed, if the templates for the compared media do not match, then it is determined that the compared media was not generated by the same encoder and, thus, did not originate from the same source. As such, the network streams or files associated with the media do not require further processing to confirm that they were created by the same encoder.

At operation 210, after identifying matching templates for two or more of the analyzed media, the second step of the source identification process is performed. At operation 210 the data streams associated with each matching media are accessed to identify portions of the same media content from each of the streams. As previously discussed, the second step of the two-part analysis requires comparing the same media content form the compared data streams. At operation 210, network stream traffic from the compared streams are analyzed to identify the same media content in each of the compared streams. One of skill in the art will appreciate that any type of content analysis known to the art can be employed at operation 210 to identify similar content. For example, the audio or visual data of the network streams can be compared to identify matching content, stream data or file data can be compared to determine whether the content matches, or the like.

Upon identifying the same media content in each of the compared data streams, flow continues to operation 212 where the same portions of media from each of the data stream is compared to determine whether encoder specific features of the media are similar. As previously discussed, merely matching media content, such as visuals or audio, is not sufficient to determine whether the compared portions of media were created by the same encoder. That is, a specific frame from the same movie will look the same visually regardless of the encoder used to generate the data stream. Instead, a bit-by-bit comparison of the media is used to determine whether the media was generated by the same encoder. Alternatively, a checksum or hash of portions of the media may be generated and compared. If the compared media was generated by the same encoder, a checksum or hash generated based upon the media file data will match. As will be understood by those of skill in the art, the analysis performed at operation 212 is both time dependent and computationally intensive. As such, the initial template comparison performed in operation 208 acts as an initial filter that removes streams that are known to originate from different sources. The initial step thus reduces the number of times the content comparison of 212 needs to be performed, thereby reducing both bandwidth requirements, by reducing the number of similar media files that need to be accessed, and computational resources required to identify data streams which originate from the same source. Operation 212 results in a determination of which streams were created by the same encoder and, thus, the same source. Further detail regarding the media content comparison is described with respect to FIG. 4.

Flow continues to operation 214, where, upon identifying media generated by the same encoder, a report is generated identifying network streams that originate from the same source. FIG. 5 depicts an exemplary report 500. The report 500 includes stream identifier field 502 that identifies a data stream analyzed by the stream comparison service. The stream identifier field identifies each stream using a unique identifier. The unique identifier may include identification data, such as an IP address usable to access the stream. The report 500 may also include an encoder template field 504 that describes the template generated for data stream. In the depicted example, the templates shown in encoder template field 504 provides exemplary examples of templates generated for MPEG media, including the size and frame patter for a GOP. One of skill in the art will appreciate that the template stored in template field 504 can vary depending on the type of media being analyzed and/or the type of encoder used to generate the media. As such, aspects disclosed herein can be employed on different types of media and different types of encoders and should not be limited to the MPEG examples disclosed herein. The report 500 may also include Encoder Features field 506 which lists different encoder features that can be determined from analyzing the media. Example features include, but are not limited to, GOP size, GOP type, quantization tables, DC coefficients, etc. Report 500 may also include a Source ID field, which lists a source identifier for a data stream. Source ID field 508 includes an identifier that identifies unique encoders identified by the stream identification service. As depicted in the example report 500, three of the analyzed streams originated from Encoder A, two from Encoder D, and a single stream originated from each of Encoders B, C, and E. As discussed, aspects of the present disclosure provide information that can be used to prioritize enforcement efforts. Continuing with the example report 500, because Encoder A is used to generate media for the highest number of streams, enforcement will be prioritized on shutting down the pirate service associated with Encoder A. As such, aspects disclosed herein help to properly allocate resources for and direct enforcement operations efforts.

While aspects of FIG. 2 have been described with respect to analyzing stream video data, one of skill in the art will appreciate that the aspects disclosed herein can be performed on any type of media content, such as audio files, images, etc. Further, the aspects disclosed herein are not limited to analyzing streamed data, but can also be performed on media files.

Figure 3:
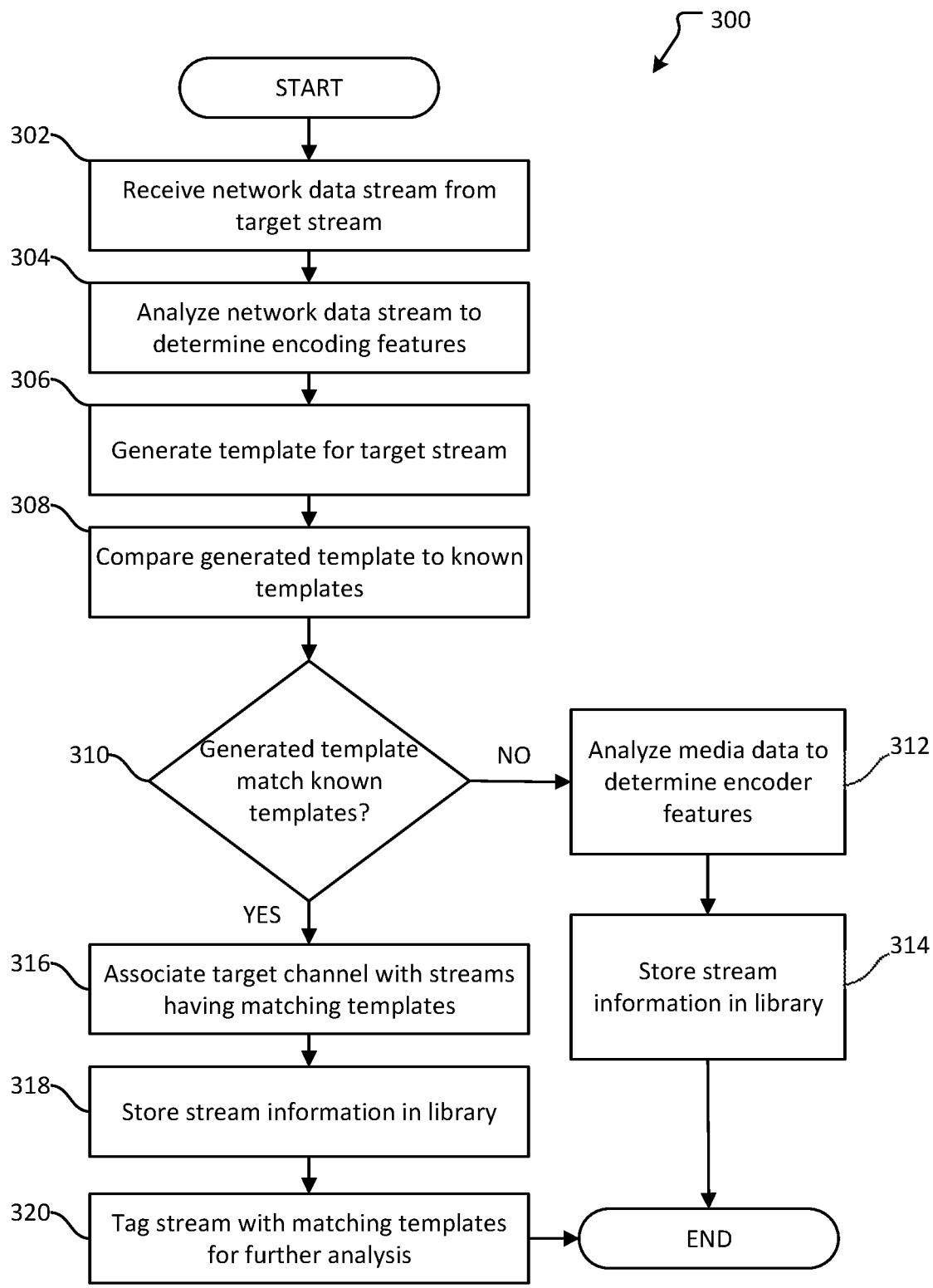
FIG. 3 is an exemplary method for generating an encoder template for target media.

FIG. 3 is an exemplary method 300 for generating an encoder template for target media. A general order of the operations for the method 300 is shown in FIG. 3. One of skill in the art, however, will appreciate that the method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2 and 4-6. In aspects, the method 300 may be executed by a device executed by the source identification service 112 shown in FIG. 1.

Flow begins at operation 302, where network traffic data is received from a target stream. As previously discussed, the network data stream may be a known stream of pirated content. In other examples, an automated service may be employed to crawl the web and identify websites streaming media. The automated service may then access stream traffic data for the streamed media at operation 302. Accessing the target network stream, in one example, comprises storing a copy of the streamed data for later analysis. Alternatively, the stream may be accessed by a packet sniffer capable of analyzing the streamed data in real-time.

At operation 304, the network data stream is analyzed to determine encoder features for the transmitted media. As previously discussed, the network data stream is analyzed to determine an encoded pattern within the data. Again referring to the MPEG examples, an encoded pattern may be determined by analyzing a sequence of frames to determine a GOP size and/or pattern. One of skill in the art, however, will appreciate that the aspects disclosed herein are not limited to video data encoded according to an MPEG variant, but, rather, the aspects disclosed herein may be employed on other types of media using other encoding standards. At operation 204, the network data is analyzed to determine a repeating pattern in the encoded data. In examples, the repeating pattern is associated with a specific encoder type, one or more encoder parameters, or any other information that can be used to identify an encoder or specific encoding behavior.

At operation 306, a template is generated that represents the identified encoder patterns. The template represents features derived from the analysis of the network data stream that will be present in media encoded by the same encoder used to generate the media transmitted in the network data stream. In examples, the template generated at operation 306 is based upon information pulled directly from the analyzed data stream. As such, generation of the template is not computationally intensive and can be quickly generated for a data stream. At operation 306, the template generated in operation 306 is compared to known and/or previously generated templates. For example, if the template is a GOP frame pattern, the template frame pattern can be compared to other templates using a string comparison. As such, one of skill in the art will appreciate that the template comparison can be performed relatively quickly using a minimal amount of computational resources.

At decision operation 310, a determination is made as to whether the template generated in operation 306 matches any known and/or previously generated templates. The determination is made based upon the comparison performed at operation 308. If the generated template does not match any known or previously generated templates, flow branches NO to operation 312. At operation 312, the streamed media data may be further analyzed to determine additional encoder features such as, but not limited to, GOP size, quantization values, DC coefficients, or any other encoder features that can be derived or identified from the network data stream. The additional features parsed from the streamed media data can be stored along with the template, thereby providing additional encoder details that could be used to identify the encoder used to generate the media. Flow continues to operation 314, where the template and/or any other encoder details are stored in a stream information library. The template is stored with an identifier for its associated stream, which will allow the stream to be compared to other stream templates at a later time and, if a match is identified, accessed to identify media for further analysis.

Referring back to decision operation 310, if the generated template matches known templates, then flow branches to operation 316 where the target stream is associated with other data streams having matching templates. As previously noted, the media from streams having matching templates may have been generated by the same encoder. As such, the matching streams are associated at operation 316 and tagged for further analysis to confirm whether the media actually originated from the same encoder and, thus, the same source. At operation 318, the stream data, and any other encoder data parsed from the stream data, is stored in a stream information library along with identifying information of streams having matching templates. At operation 320, the streams having matching templates are tagged for further analysis. As noted, additional analysis that is both time and content dependent may be performed on streams having matching templates to confirm that the media from the streams were in fact generated by the same encoder.

Figure 4:
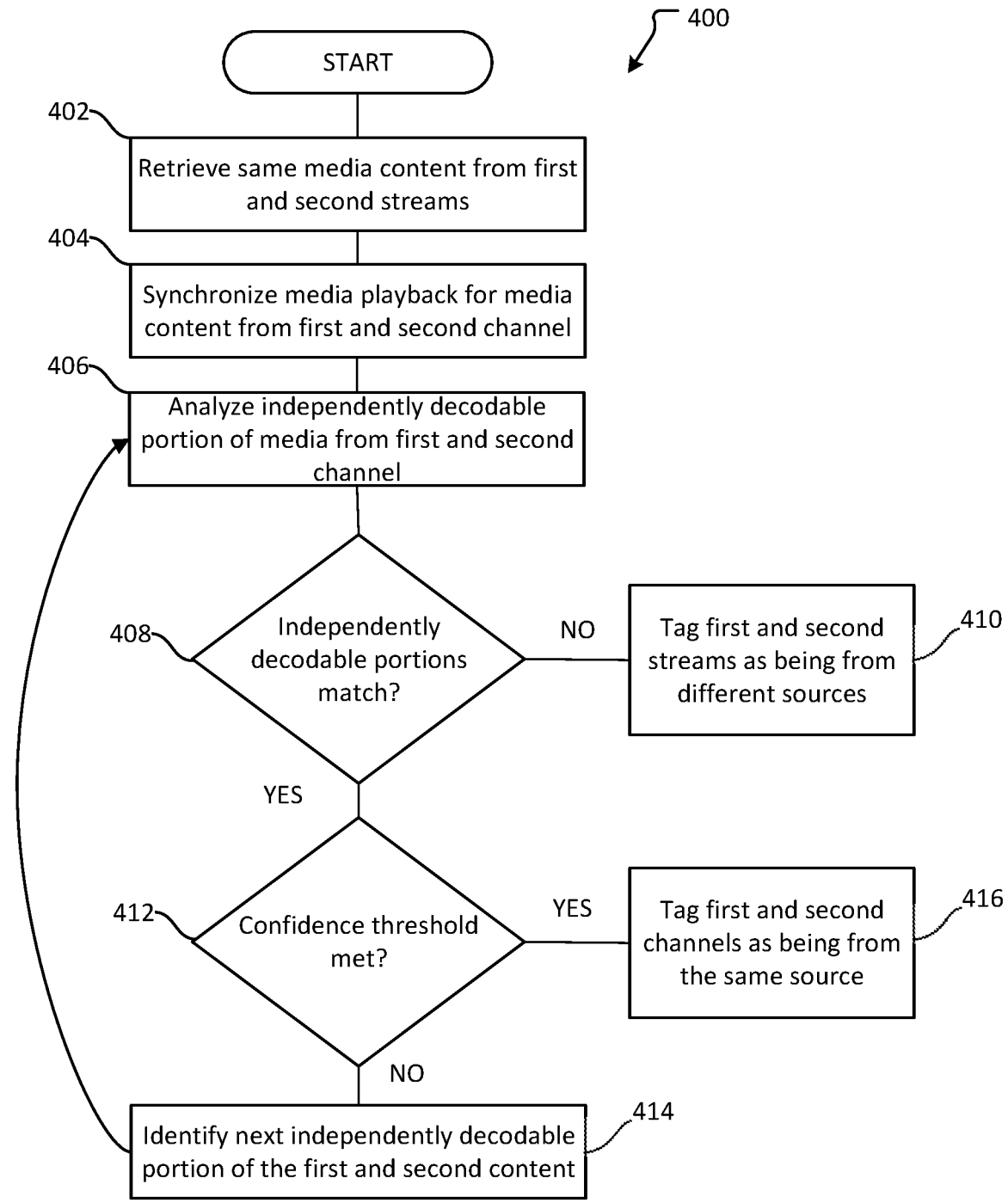
FIG. 4 depicts an exemplary method for determining that media having matching templates were generated by the same encoder.

FIG. 4 depicts an exemplary method 400 for determining that media having matching templates were generated by the same encoder. A general order of the operations for the method 400 is shown in FIG. 4. One of skill in the art, however, will appreciate that the method 300 may include more or fewer steps or may arrange the order of the steps differently than those shown in FIG. 3. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3 and 5-6. In aspects, the method 400 may be executed by a device executed by the source identification service 112 shown in FIG. 1.

In examples, the method 400 is performed on media accessed from two or more data streams that have the same template, as identified by method 300 in FIG. 3. Flow begins at operation 402 where network traffic data from the two or more streams is analyzed to identify the same media content from each of the streams. As opposed template generation, which is both content and time independent, the analysis performed by method 400 compares the same media content at the same point in time. As such, the method 400 is more computationally intensive. However, performing the template comparison of method 300 prior reduces the number of streams requiring the analysis of method 400, thereby resulting in a more efficient stream comparison process.

At operation 402, network traffic data is analyzed to identify the same content from each of the data streams having matching templates. Network stream traffic from the compared streams are analyzed to identify the same media content in each of the compared streams. One of skill in the art will appreciate that any type of content analysis known to the art can be employed to identify similar content. For example, the audio or visual data of the network streams can be compared to identify matching content, stream data or file data can be compared to determine whether the content matches, or the like.

After operation 404, after identifying matching content, the matching content from each stream is synchronized. In one example, the streams may be synchronized by identifying a first portion of content in the first stream. The second stream is analyzed to determine when the same portion of content is played. For example, an I-frame from the first content may be identified. I-frames from the second streamed content are then compared to the identified I-frame to find a matching I-frame in the second streamed content. Unlike the template analysis, the content represented by the I-frames in the first and second streams must be the same for the second step analysis. In the case of MPEG, and I-frame is a complete image of a video frame. In the MPEG example, synchronizing the first and second streamed content comprises identifying the same image in the first and second streamed content. One of skill in the art will appreciate that any techniques used to identify matching content may be employed for the synchronization step without departing from the scope of this disclosure.

At operation 406, the synchronized portions of the media content are analyzed to determine if the media content was generated by the same encoder. As previously discussed, merely matching portions of media, for example, sound files, images, etc., is not enough to confirm that the media was generated by the same encoder as different encoders should generate media that is visually and audibly indistinguishable. However, the filed data generated by different encoders should be distinct. As such, the analysis performed at operation 406 is based upon file features. As such, a bit-by-bit comparison, a checksum comparison, a hash comparison, or any other type of file data comparison technique may be performed at operation 406. In certain aspects, the comparison may not be performed on the entire media file. Rather, the comparison may focus on an independently decodable portion of the media files. For example, if the media file is a MPEG video, corresponding I-frames from the media files may be compared.

Flow continues to decision operation 408 where, based upon the comparison performed in operation 406, a determination is made as to whether the analyzed portion of the media files match. If the portion of the media file does not match, flow branches No to operation 410. At operation 410, the two media streams are tagged as being from different encoders and, as such, to originate from different sources. If however, the portions of the media match, flow branches YES from decision operation 408 to operation 412. At operation 412, a determination is made as to whether the media comparison meets a confidence threshold. As previously discussed, while uncommon, it is possible for two different encoders to generate matching portions of a media file. As such, a single matching portion may not be enough to determine the compared media files were in fact generated by the same decoder. However, as additional portions of the media files are compared and found to match, it becomes more likely that the media files were in fact generated by the same encoder. As such, if the threshold value has not been reached flow branches NO from operation 412 to operation 414. At operation 414, a subsequent portion of the media files is identified for comparison. In examples, the next portion may be the next frame, i.e., the subsequent B-frame or P-frame in an MPEG file. Alternatively, instead of performing the analysis on the very next portion of the media file, the next independently decodable media portion of the file may be identified for analysis. Referring again to the MPEG example, the next I-Frame may be identified at operation 414. While the example provided herein describe portions of video files, one of skill in the art will appreciate that portions of other types of media may be identified for analysis at operation 416 without departing from the scope of this disclosure. Flow then returns to operation 406 the method 400 continues by analyzing the next identified portion of the media file.

Returning to decision operation 412, if a confidence value has been met, then flow branches YES to operation 416 where the compared data streams are tagged as being from the same source. Tagging the data streams as originating from the same source may include associating the two data streams with the same encoder identifier, such as the encoder identifiers depicted in Source ID field 508 of report 500.

Figure 6:
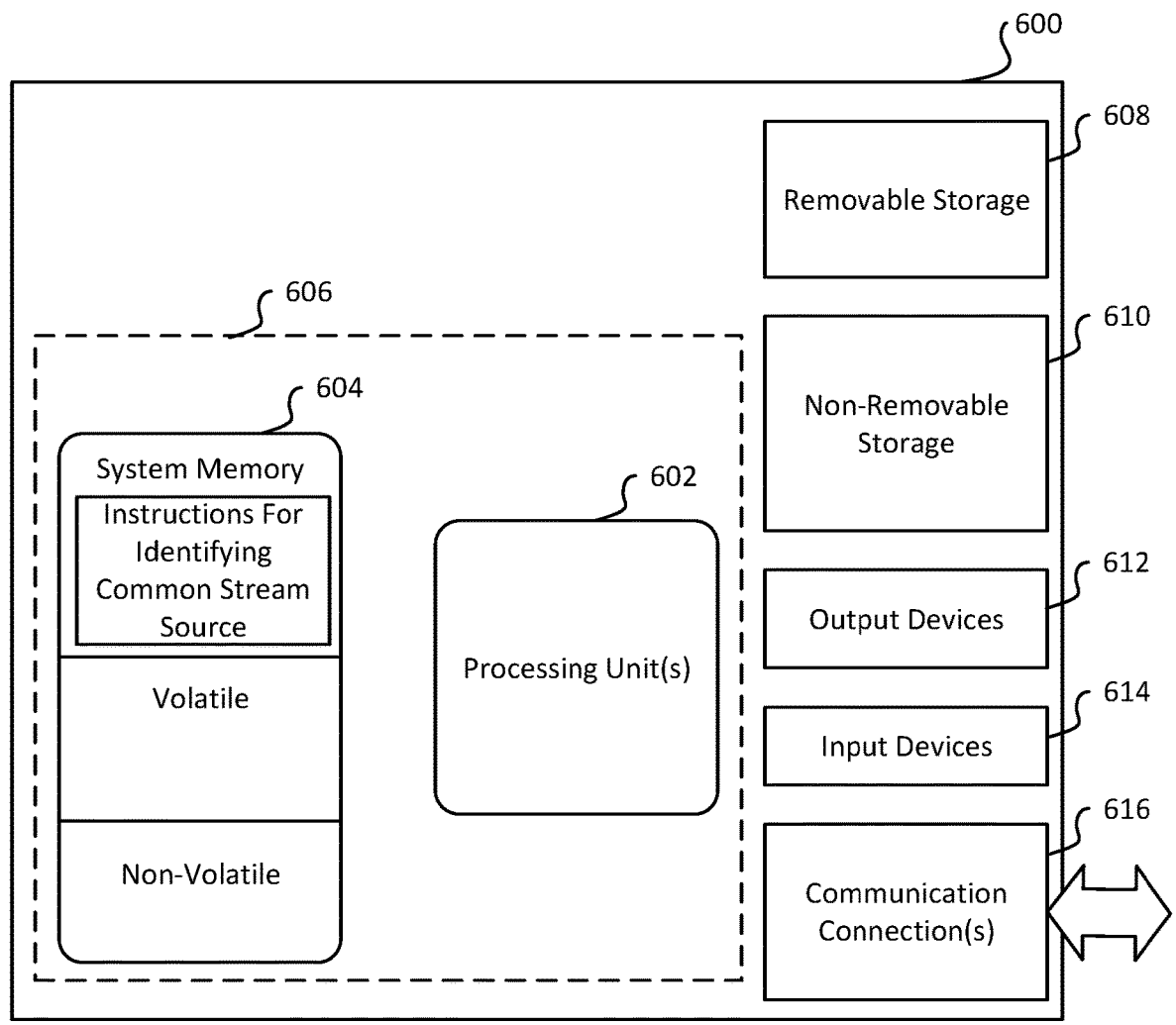
FIG. 6 is a block diagram illustrating example physical components of a computing device with which aspects of the disclosure may be practiced.

FIG. 6 illustrates a simplified block diagram of a device with which aspects of the present disclosure may be practiced in accordance with aspects of the present disclosure. The device may be a server computer, a mobile computing device, or a set-top-box, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to identify common stream sources as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. In some aspects, the removable storage 608 includes a subscriber card (e.g., a smart card and a subscriber identification module (SIM) card). Similarly, the operating environment 600 may also have input device(s) 614 such as remote controller, keyboard, mouse, pen, voice input, on-board sensors, etc. and/or output device(s) 616 such as a display, speakers, printer, motors, etc. Also included in the environment may be one or more communication connections, 612, such as LAN, WAN, a near-field communications network, a cellular broadband network, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method comprising:
   receiving network traffic data from a first data stream, wherein the first data stream transmits media encoded by a first encoder;
   analyzing video data extracted the network traffic data to identify a data pattern associated with encoder functionality;
   generating a first template for the first data stream, the template is based upon the data pattern associated with the encoder functionality, wherein the template generated for the first encoder is the same for the first encoder regardless of the content encoded by the first encoder;
   comparing the first template for the first data stream to a plurality of templates associated with a plurality of data streams;
   identifying a second data stream having a second template that matches the first template; and
   storing the first template in a stream data library associating the first and second data streams.

2. The computer-implemented method of claim 1, wherein the first data stream transmits pirated media content.

3. The computer-implemented method of claim 1, wherein the first data stream comprises encoded video.

4. The computer-implemented method of claim 3, wherein the first template is based upon a group of pictures (GOP) for the encoded video.

5. The computer-implemented method of claim 4, wherein the first template captures a size of the GOP and a frame pattern for the GOP.

6. The computer-implemented method of claim 1, further comprising:
   identifying a first media content transmitted via the first data stream; and
   monitoring the second data stream to identify second media content transmitted via the second data stream, wherein the first media content and the second media content are the same.

7. The computer-implemented method of claim 6, further comprising:
   identifying a first portion of the first media content; and
   synchronizing the first media content and the second media content, wherein synchronizing the first media content and the second media content comprises identifying a second portion of the second media content that corresponds to the first portion of the media content.

8. The computer-implemented method of claim 7, further comprising:
   comparing first file data corresponding to the first portion of the first media content and second file data corresponding to the second portion of the second media content; and
   based upon the comparison, determining that the first media content and the second media content was encoded using the first encoder.

9. A system comprising:
   at least one processor; and
   memory encoding computer executable instructions that, when executed by the at least one processor, cause the at least one processor to perform operations comprising:
   receive network traffic data from a first data stream, wherein the first data stream transmits media encoded by a first encoder;
   analyze video data extracted from the network traffic data to identify a data pattern associated with encoder functionality;
   generate a first template for the first data stream, the template is based upon the data pattern associated with the encoder functionality, wherein the template generated for the first encoder is the same for the first encoder regardless of the content encoded by the first encoder;
   compare the first template for the first data stream to a plurality of templates associated with a plurality of data streams;
   identify a second data stream having a second template that matches the first template;
   after identifying the second data stream, identify a first media content transmitted via the first data stream;
   monitor the second data stream to identify second media content transmitted via the second data stream, wherein the first media content and the second media content are the same;

compare the first media content and the second media content;

based upon the comparison, determine the first media content and the second media content was encoded by the first encoder; and tag the first data stream and the second data stream as originating from a single source.

10. The system of claim 9, wherein the first media content and the second media content is video content.

11. The system of claim 10, wherein the first template is based upon a group of pictures (GOP) for the encoded video, and wherein the first template represents a size of the GOP and a frame pattern for the GOP.

12. The system of claim 11, wherein comparing the first media content further comprises:

identifying a first portion of the first media content; and synchronizing the first media content and the second media content, wherein synchronizing the first media content and the second media content comprises identifying a second portion of the second media content that corresponds to the first portion of the media content.

13. The system of claim 12, wherein comparing the first media content further comprises comparing first file data corresponding to the first portion of the first media content and second file data corresponding to the second portion of the second media content.

14. The system of claim 13, wherein comparing the first file data and second file data further comprises:

generating a first checksum using the first file data;

generating a second checksum using the second file data; and comparing the first and second checksum.

15. The system of claim 11, wherein the video is encoded using an MPEG codec.

16. A computer storage medium encoding computer executable instructions that, when executed by at least one processor, perform a method comprising:

receiving network traffic data from a first data stream, wherein the first data stream transmits media encoded by a first encoder;

analyzing video data extracted from the network traffic data to identify a data pattern associated with encoder functionality;

generating a first template for the first data stream, the template is based upon the data pattern associated with the encoder functionality, wherein the template generated for the first encoder is the same for the first encoder regardless of the content encoded by the first encoder;

comparing the first template for the first data stream to a plurality of templates associated with a plurality of data streams;

identifying a second data stream having a second template that matches the first template;

after identifying the second data stream, identifying a first media content transmitted via the first data stream;

monitoring the second data stream to identify second media content transmitted via the second data stream, wherein the first media content and the second media content are the same;

comparing the first media content and the second media content;

based upon the comparison, determining the first media content and the second media content was encoded by the first encoder; and tagging the first data stream and the second data stream as originating from a single source.

17. The computer storage medium of claim 16, wherein comparing the first media content further comprises:

identifying a first portion of the first media content; and synchronizing the first media content and the second media content, wherein synchronizing the first media content and the second media content comprises identifying a second portion of the second media content that corresponds to the first portion of the media content.

18. The computer storage medium of claim 17, wherein comparing the first media content further comprises comparing first file data corresponding to the first portion of the first media content and second file data corresponding to the second portion of the second media content.

19. The computer storage medium of claim 18, wherein comparing the first file data and second file data further comprises:

generating a first checksum using the first file data;

generating a second checksum using the second file data; and comparing the first and second checksum.

20. The computer storage medium of claim 16 wherein the first template is based upon a group of pictures (GOP) for the encoded video, and wherein the first template represents a size of the GOP and a frame pattern for the GOP.

* * * * *